United States Patent
Livshits et al.

(10) Patent No.: US 12,229,293 B2
(45) Date of Patent: Feb. 18, 2025

(54) SECURE CLIENT WATERMARK

(71) Applicant: Synamedia Limited, Staines Upon Thames (GB)

(72) Inventors: David Livshits, Geva Binyamin (IL); Steven Jason Epstein, Hashmonaim (IL); Amir Hochbaum, Modiin (IL)

(73) Assignee: Synamedia Limited, Maidenhead (GB)

( * ) Notice: Subject to any disclaimer, the term of this patent is extended or adjusted under 35 U.S.C. 154(b) by 344 days.

(21) Appl. No.: 17/706,963

(22) Filed: Mar. 29, 2022

(65) Prior Publication Data

US 2023/0315882 A1 Oct. 5, 2023

(51) Int. Cl.
  *H04N 1/387* (2006.01)
  *G06F 21/62* (2013.01)
  *G06T 1/00* (2006.01)

(52) U.S. Cl.
  CPC ........ *G06F 21/6218* (2013.01); *G06T 1/0021* (2013.01)

(58) Field of Classification Search
  None
  See application file for complete search history.

(56) References Cited

U.S. PATENT DOCUMENTS

| | | | |
|---|---|---|---|
| 6,553,127 B1 | 4/2003 | Kurowski | |
| 8,818,021 B2* | 8/2014 | Brubeck | H04N 21/8456 382/100 |
| 9,665,723 B2* | 5/2017 | Dabbiere | G06F 21/60 |
| 2006/0257001 A1 | 11/2006 | Van Der Veen et al. | |
| 2007/0266252 A1* | 11/2007 | Davis | G06F 21/10 713/176 |
| 2008/0071617 A1* | 3/2008 | Ware | G06Q 30/0225 726/28 |
| 2010/0008500 A1* | 1/2010 | Lisanke | G06T 1/0021 380/201 |
| 2010/0135524 A1 | 6/2010 | Durst, Jr. et al. | |
| 2016/0140681 A1* | 5/2016 | Ramos | H04N 1/32144 715/205 |
| 2018/0107887 A1 | 4/2018 | Huber, Jr. et al. | |

OTHER PUBLICATIONS

Joshua Shulman et al., "How to Trust Your Player," Bitmovin, Aug. 20, 2020, pp. 1-28.

* cited by examiner

*Primary Examiner* — Christopher B Robinson
(74) *Attorney, Agent, or Firm* — Fernando & Partners, LLP

(57) ABSTRACT

Techniques for securing client watermarks are described herein. In accordance with various embodiments, a server receives a request from a client device for authorizing rendering a media content item at the client device. A validation engine on the server obtains at least a portion of an image representing a screen capture of rendering the media content item including a client watermark and/or metadata associated with the rendering. The validation engine then validates the watermark based at least in part on at least the portion of the image and/or the metadata. Having invalidated the client watermark, the server causes disruption of rendering the media content item at the client device. On the client side, a watermark engine captures the image of rendering the media content item including the client watermark and requests the server to validate the client watermark and renew the authorization based on the validation.

19 Claims, 8 Drawing Sheets

SECURE CLIENT WATERMARK

TECHNICAL FIELD

The present disclosure relates generally to security in multimedia content delivery and, more specifically, to detecting watermark tampering.

BACKGROUND

Over-the-top (OTT) content watermarking is a security solution that documents ownership for tracking the consumer of the content. Watermarking allows detecting the source of content leakage in the case of the content being illegally re-distributed, thus further allowing the blockage of the subsequent unauthorized content consumption. There are two main watermarking approaches, namely, headend-based solutions and client-based solutions. Headend-based solutions deliver content to client devices with watermarks embedded at the server, whereas client-based solutions rely on utilities on the client side to generate and insert watermarks into images. Previously existing client-based watermark solutions have certain security weaknesses. Particularly in open platforms, when watermark images cannot be securely blended with video frames but are set on top of the video by a client application, the attackers can prevent the watermark images from appearing without affecting the video playback. Lacking the capability of detecting the watermark presence, any watermark enforcements in previously existing watermark client solutions are ineffective. As such, many previously existing client-based watermarking solutions cannot securely and reliably validate client watermarks, e.g., validating the presence of a watermark and/or whether the watermark has been tampered with.

BRIEF DESCRIPTION OF THE DRAWINGS

So that the present disclosure can be understood by those of ordinary skill in the art, a more detailed description may be had by reference to aspects of some illustrative embodiments, some of which are shown in the accompanying drawings.

Figure 1A:
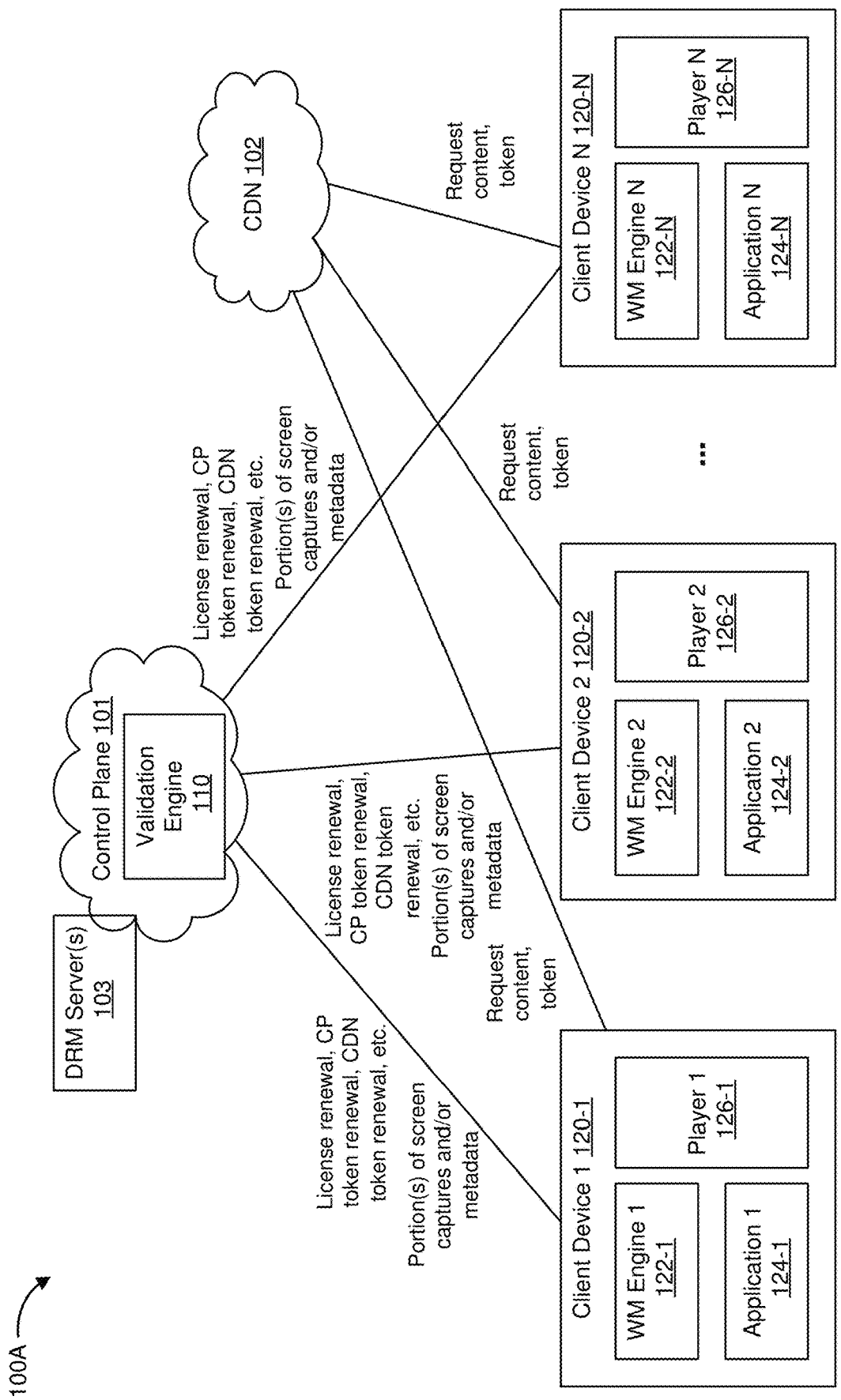
FIG. 1A is a block diagram of an exemplary over-the-top (OTT) content delivery system that uses client watermarking for content protection, in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

DESCRIPTION OF EXAMPLE EMBODIMENTS

Numerous details are described in order to provide a thorough understanding of the example embodiments shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example embodiments described herein.

Overview

A secure client-based watermark solution described herein in accordance with various embodiments enforces client-side watermark protection for continued content play by performing tamper validation on the server side. It is applicable to any kind of client platforms, e.g., mobile platforms, desktop, Web applications, set-top-boxes, etc. The solution has a client-side watermark engine and a server-side validation engine (e.g., a control plane). The client-side watermark engine performs screen capture when a multimedia content item and a client watermark are rendered. In some embodiments, the captured image includes the client watermark even when the video itself is not captured, e.g., due to the usage of secure video paths. In some embodiments, the client-side watermark engine sends at least a portion of the captured image and optionally metadata related to the image to the server-side validation engine, e.g., periodically or along with the communication to the control plane. In response, the server-side validation engine validates the client watermark, e.g., the watermark is presented in the image and includes the proper watermark identifier (WMID), and/or the video fragment in the image belongs to the proper range, etc. Based on the validation result (e.g., valid WMID detected or not detected), the service provider can take appropriate actions to cause disruption of continued services, e.g., forcing deactivation of the user/device, blocking digital rights management (DRM) license renewal, obtaining data for further analysis, and/or limiting the content resolution, etc. Although the solution described herein does not prevent client watermark removal or tampering, it allows the server to detect whether the client watermarks are secure, e.g., whether a client-side embedded watermark has been removed and/or tampered with.

In accordance with various embodiments, a method for validating client watermarks and authorizing continued content rendering based on the validation is performed at a server that includes a processor and a non-transitory memory. The method includes receiving a request from a client device for authorizing rendering a media content item at the client device. The method further includes obtaining one or more of at least a portion of an image including a watermark and metadata associated with rendering the media content item at the client device, where the watermark is embedded into the media content item by the client device and the image is a screen capture of rendering the media content item at the client device. The method also includes validating the watermark based at least in part on one or more of at least the portion of the image and the metadata. The method additionally includes causing disruption of rendering the media content item at the client device in accordance with invalidating the watermark.

In accordance with various embodiments, a method for submitting client watermarks for validation in order to obtain an authorization of continued content rendering is performed at a client device that includes a processor and a non-transitory memory. The method includes requesting from a server an authorization to render a media content item. The method further includes generating a watermark and embedding the watermark into the media content item. The method also includes capturing an image of rendering the media content item including the watermark. The method additionally includes sending to the server one or more of at least a portion of the image and metadata associated with the image, where one or more of at least the portion of the image and the metadata are used by the server to validate the watermark and renew the authorization based on the validation.

Example Embodiments

Client watermark detection methods, devices, and systems in accordance with various embodiments described herein solve the aforementioned security issues in previously existing client-side watermark solutions. A watermark engine on the client side in combination with a validation engine on the server side securely validate the presence of the client watermark and whether the client watermark has been tampered with. Because the watermarked image captured by the client device is analyzed on the server side, the methods, devices, and systems are more secure and reliable than previously existing solutions that solely rely on client facilities for client watermark validation. Further, in some embodiments, the client watermark validation on the server side can utilize the information from metadata, tokens, and/or renewal requests for validation, thus leveraging the information on the server side for enhanced enforcement of client watermarking and content protection.

Reference now is made to FIG. 1A, a diagram illustrating an exemplary over-the-top (OTT) content delivery system 100A that uses client watermarking for content protection in accordance with some embodiments. In the exemplary OTT content delivery system 100A, a control plane 101 is a server that performs multiple tasks, such as login authentication, authorization, and/or providing resources. Also in the exemplary system 100A, a content delivery network (CDN) 102 provides content (also referred to hereinafter as media content, a media content item, a media asset, or an asset) to client devices, e.g., client device 1 120-1, client device 2 120-2, . . . , client device N 120-N, etc., collectively referred to hereinafter as the client devices 120 or a respective client device 120.

In some embodiments, the exemplary system 100A includes digital rights management (DRM) server(s) 103 for content protection. In some embodiments, the DRM server(s) 103 are communicatively coupled with the control plane 101. Further, although not shown in FIG. 1A, in some embodiments, the DRM server(s) 103 include a key security module (KSM) for providing and maintaining keys for encryption and/or a license server for packaging keys into DRM licenses and maintaining the DRM licenses, etc. During the login phase, the control plane 101 authenticates users based on the information received from client devices 120. Upon successful authentication of a respective client device 120, the control plane 101 sends various token(s) to the respective client device 120 for access to resources, e.g., control plane tokens, CDN tokens, etc. in accordance with various embodiments.

In some embodiments, upon receiving encrypted content, the client device 120 obtains DRM authorization token(s) from the control plane 101 and uses the DRM authorization tokens as part of a license request to get specific DRM license(s) for decryption. Though not shown in FIG. 1, in some embodiments, the CDN 102 receives the content from a headend that has DRM protection, e.g., an encoder at the headend encodes the content for streaming and an encryptor at the headend encrypts the content using keys from the DRM server(s) 103 for protection. In some embodiments, an origin server at the headend receives the content from the encoder and encryptor and distributes the content to the CDN 102 for delivery to the client devices 120.

In some embodiments, a token or a license from the control plane 101 and/or the DRM server(s) 103 has an expiration time attribute, e.g., specifying an expiration timestamp, such that it is valid within a period of time and expired after the period of time. When the current time is approaching the expiration timestamp, the respective client device 120 can request a renewal of the token or the license, which allows the respective client device 120 to use the renewed token or license for continued content streaming from the CDN 102 and/or for decrypting the content for continued rendering.

On the client side, in some embodiments, each of the client devices 120 includes a watermark engine (e.g., watermark engine 1 122-1 on client device 1 120-1, watermark engine 2 122-2 on client device 2 120-2, . . . , watermark engine N 122-N on client device N 120-N, collectively referred to hereinafter as a watermark engine 122), an application 124 (e.g., application 1 124-1 on client device 1 120-1, application 2 124-2 on client device 2 120-2, . . . , application N 124-N on client device N 124-N, collectively referred to hereinafter as an application 124), and a player 126 (e.g., player 1 126-1 on client device 1 120-1, player 2 126-2 on client device 2 120-2, . . . , player N 124-N on client device N 124-N, collectively referred to hereinafter as a player 124).

In some embodiments, the application 124 interacts with the control plane 101, the CDN 102, and/or the DRM server(s) 103 to obtain authentication, authorization, and/or the content. In some embodiments, the player 126 is coupled to the application 124 and the watermark engine 122 for playing the content and/or for ceasing to play the content. For example, the player 126 obtains the DRM license and the encrypted content from the application 124, decrypts the content using the key in the DRM license, and renders the decrypted content, which may include watermarks and the rendering of the content triggers the watermark engine 122 to start capturing the rendering. In another example, upon a failed validation and/or authorization, the application 124 receives instructions from the control plane 101 and accordingly instructs the player 126 to cease playing the content or downgrade the quality of the content.

In some embodiments, the watermark engine 122 (e.g., including software development kit(s) (SDK(s))) facilitates the client watermark embedding, e.g., according to the signaling from the server side. As used herein, the term "client watermark" is used interchangeably with the term "watermark". As such, a client watermark identifier (ID) is also referred to hereinafter as a watermark ID or a WMID. In some embodiments, the watermark engine 122 is configured to capture images when the player 126 plays assets that require client watermarking. As such, whether the watermarks are blended with the content or presented in a separate window on top of playback windows, the captured image has the watermarks. In some other embodiments, the watermark engine 122 is configured to periodically perform screen captures. In some embodiments, the captured images have watermarks even in the case of the video not being captured due to secure video path use, e.g., a hardware protected pipeline where the media content is processed in such a way that the content and/or keys for decrypting the content are not accessible from the application 124 and/or the watermark engine 122. In such embodiments, the captured image includes the watermark on top of a monotonic background instead of video frames.

Figure 1B:
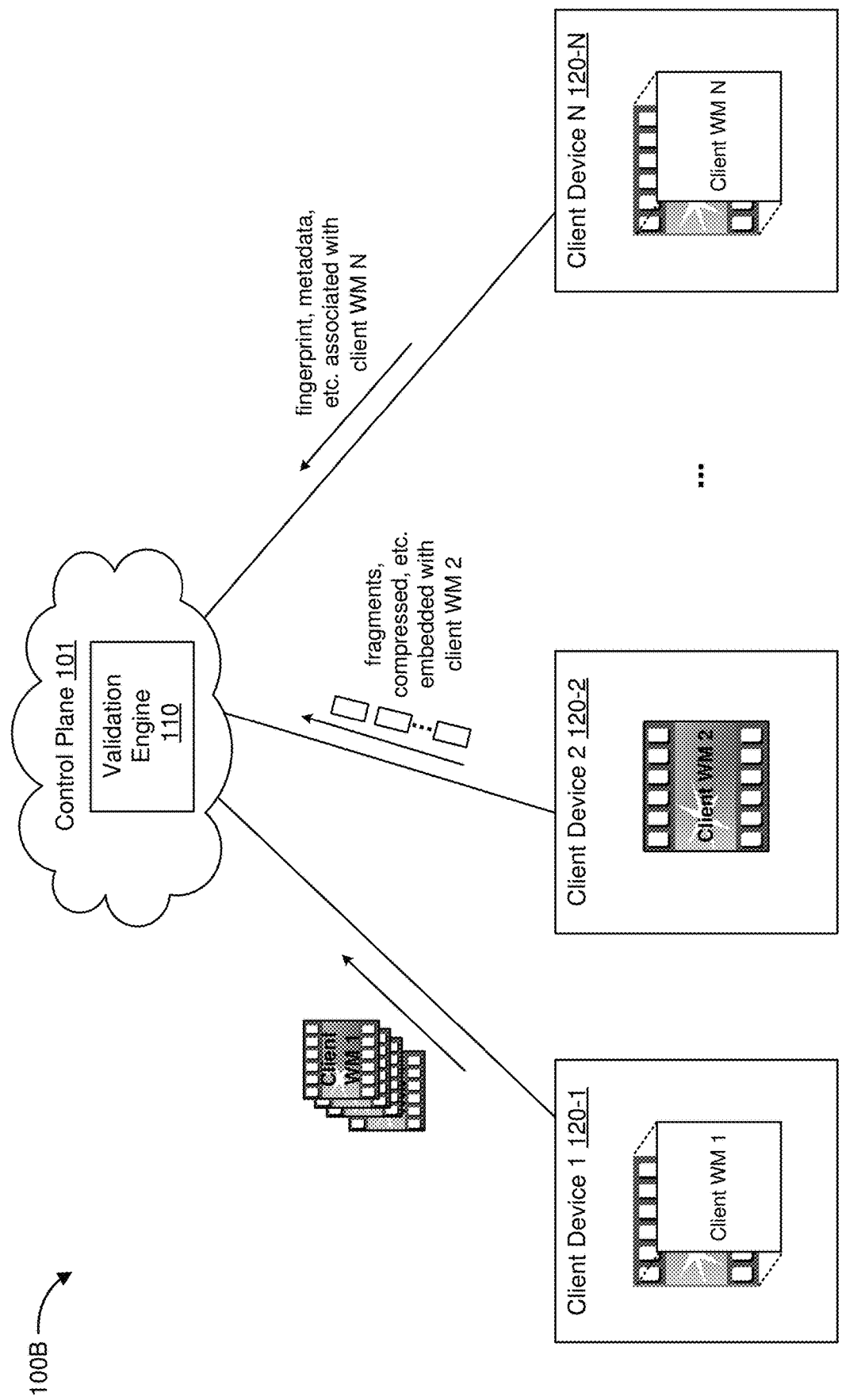
FIG. 1B is a block diagram illustrating sending client watermarks to a control plane in the exemplary OTT content delivery system for validation by a validation engine in the control plane, in accordance with some embodiments.

In some embodiments, the watermark engine 122 further processes the screen captures. For example, FIG. 1B is a diagram 100B illustrating various embodiments of sending client watermarks to the control plane 101 for validation by the validation engine 110. In various embodiments, the watermark engine (e.g., the watermark engine 122 in FIG. 1A) sends the captured images, processed images, and/or metadata extracted from the screen captures. As such, at least a portion of the captured image, whether in compressed or uncompressed form, and/or the metadata are sent to the control plane 101 for validation by the validation engine 110.

For instance, in FIG. 1B, the player (e.g., player 1 126-1 in FIG. 1A) on client device 1 110-1 plays a video with client watermark 1 on top of the video. The watermark engine (e.g., watermark engine 1 122-1 in FIG. 1A), which is coupled with the player, detects that the player is rendering a video requiring watermarking in accordance with some embodiments. In response, the watermark engine records a screen capture of the rendering video so that the watermark is recorded in each picture of the video. The application on client device 1 120-1 (e.g., application 1 124-1 in FIG. 1A) then sends in the screen capture to the control plane 101 for validation by the validation engine 110.

In another example, in FIG. 1B, the watermark engine on client device 2 120-2 (e.g., watermark engine 2 122-1 in FIG. 1A) records the screen capture with the watermark and performs compression or partial compression of at least parts of the images, generates fingerprints of the images, and/or splits a captured video into segments, partial segments, fragments, and/or frames, etc. The application on client device 2 120-2 (e.g., application 2 124-2 in FIG. 1A) then sends the processed screen capture to the control plane 101 for validation by the validation engine 110.

In yet another example, in FIG. 1B, the watermark engine on client device N 120-N (e.g., watermark engine N 122-N in FIG. 1A) records the screen capture with the watermark. Further, the watermark engine on client device N 120-N calculates fingerprints (e.g., fingerprints of the video and/or client watermark ID) and/or extracts the metadata from the token(s) and/or the captured image, e.g., the played asset, the client identifier(s), and/or the playback position, etc. The application on client device N 120-N then sends the extracted fingerprints and/or metadata to the control plane 101 for validation by the validation engine 100.

There are multiple models for client watermarking, and various models have various security weak points. For example, in FIG. 1B, client watermark 2 is blended with the video for rendering on client device 2 120-2. From the watermark generation to the rendering, in some models, the watermark is generated in a non-secure environment but is securely blended and/or rendered, and in some other models, the watermark can be generated in a secure environment but blended and/or rendered in a non-secure environment. As such, the tampering can happen during the watermark generation process, on the way for rendering and/or blending, or during rendering. In another example, on client device 1 120-1 or client device N 120-N, client watermark 1 or client watermark N is generated but not blended with the video. Rather, client watermark 1 or client watermark N is rendered on top of the videos, e.g., rendering client watermark 1 on top of the video on client device 1 120-1 or rendering client watermark N on top of the video on client device N 120-N. The screen capture solution for client watermark tamper detection described herein is effective in any client watermark model. In particular, the image captures rendering of the video with the watermark for tamper detection regardless whether the watermark is blended with the video (e.g., on client device 2 120-2) or on top of the video (e.g., on client device 1 120-1 or on client device N 120-N), and regardless whether the watermark has been tampered with at any point in time from the generation stage to the rendering stage.

Referring back to FIG. 1A, in some embodiments, as will be described in further detail with reference to FIG. 2, the screen capture, the processed screen capture, and/or metadata extracted as shown in FIG. 1B are sent to the control plane 101 periodically or along with license renewal(s), token renewal(s), and/or heartbeat/concurrency request(s). In some embodiments, the metadata are added from time to time, accumulated for further transmission, or added to every interaction with the server side. In some embodiments, upon receiving at least a portion of the screen captures and/or the metadata, as will be described in further detail below, a validation engine 110 in the control plane 101 validates the client watermark based on the screen capture image, the information in the request, and/or the metadata. Upon successful validation, the control plane 101 responds to the license and/or token renewal request(s) and obtains the renewed license(s) and/or token(s) for the client device 120. On the other hand, upon failed validation, the control plane 101 declines to renew the authorization for the client device 120, thus causing disruption to the content consumption at the client device 120.

It should be noted that components are represented in the exemplary OTT system 100A for illustrative purposes. Other configurations can be used and/or included in the exemplary OTT system 100A. Further, components can be divided, combined, and/or re-configured to perform the functions described herein. For example, the screen capture and/or the image processing can be performed by the watermark engine 122 and/or the application 124. In another example, the validation engine 110 can reside within the control plane 101 or as a separate server from server(s) on the control plane 101. Additionally, the exemplary OTT system 100 can include other subcomponents to facilitate the client-side screen capture and/or the image processing as well as the server-side client watermark validation. For example, the watermark engine 122 can have multiple sub units for various tasks, e.g., one for client watermark embedding, a different one for screen capture, and/or another one for captured image processing, etc. Further, the various features of implementations described herein with reference to FIG. 1A may be embodied in a wide variety of forms, and that any specific structure and/or function described herein is merely illustrative. For example, the client device 120 can have any number of client platforms, such as a mobile platform, a desktop platform, a Web application, and/or a STB, etc.

Figure 2:
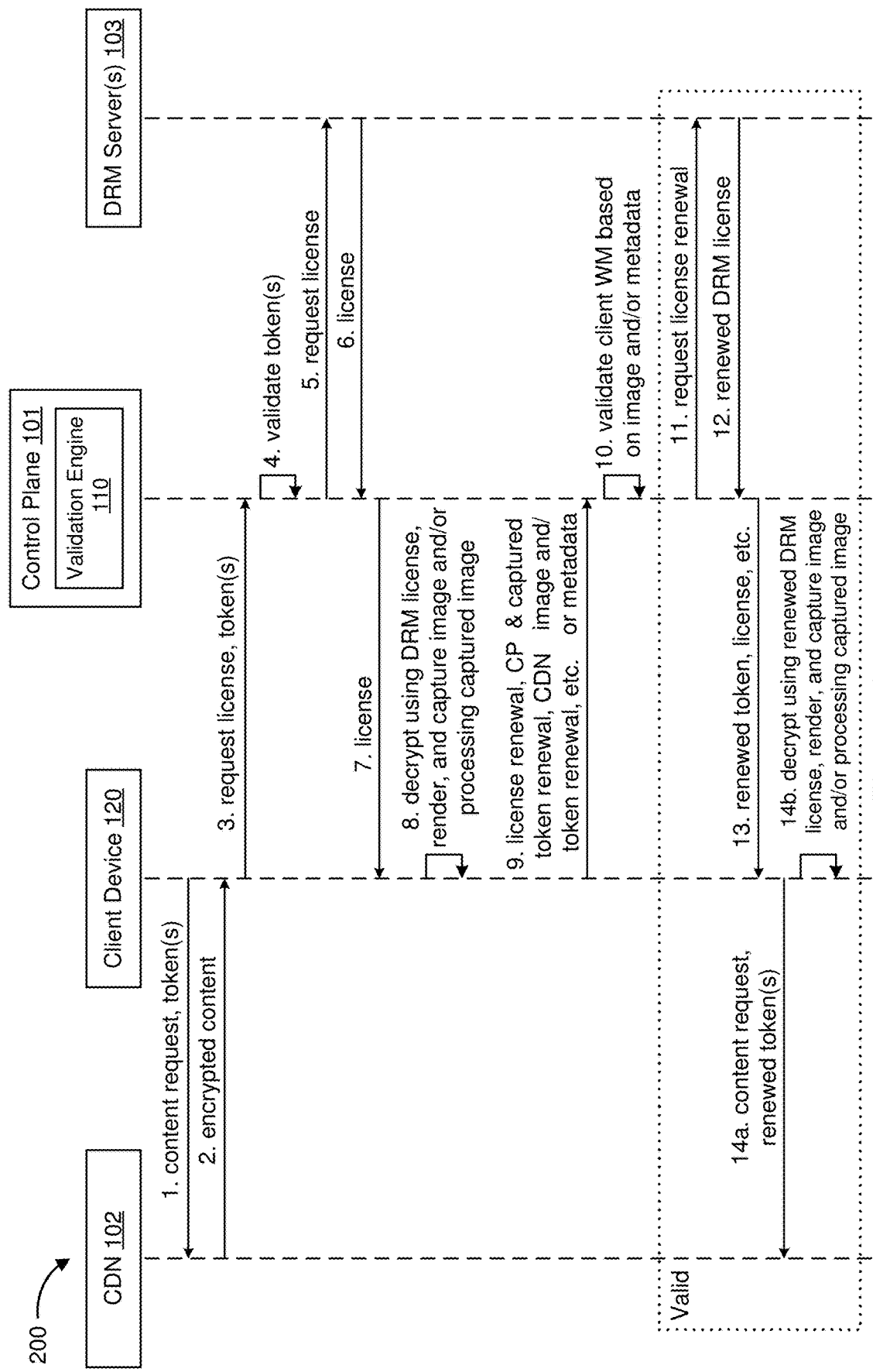
FIG. 2 is a sequence diagram illustrating recording, processing, and sending screen captures for client watermark validation in the exemplary OTT content delivery system, in accordance with some embodiments.

FIG. 2 is a sequence diagram 200 illustrating recording, processing, and sending screen captures for client watermark validation in the exemplary OTT content delivery system 100A in accordance with some embodiments. In step 1 of the sequence diagram 200, the CDN 102 receives a content request from the client device 120. Along with the content request, the client device 120 attaches token(s), e.g., the token(s) received from the control plane 101 upon successfully login and/or authentication. In some embodiments, the request and/or the token(s) identifies the client at the client device 120 consuming the media content, e.g., the URL corresponding to the location of the media content item, the asset ID for the media content item, the session ID, the user ID, the device ID, the authorization by the control plane 101 to access certain assets on the CDN 102, etc. Based on the information in the content request and/or the token(s), in step 2, the CDN 102 sends the requested content to the client device 120.

In some embodiments, the content is DRM protected, e.g., encrypted using a key assigned by the DRM server(s) 103 (FIG. 1A). To decrypt the content, in step 3, the client device 120 sends a license request to the control plane 101 and attaches token(s) that were granted by the control plane 101. In some embodiments, in step 4, the control plane 101 validates the token(s) and upon successful validation, the control plane 101 sends a license request to the DRM server(s) 103 for the client device 120 in step 5. In some embodiments, the DRM server(s) 103 generates key(s) according to the request, packages the key(s) in a DRM license, and sends the DRM license to the control plane 101 in step 6. In some embodiments, the DRM license has an expiration time attribute so that the DRM license is valid for a duration.

In step 7, the control plane 101 forwards the DRM license to the client device 120 so that the client device 120 can use the key in the DRM license to decrypt the content for rendering in step 8. Also in step 8, upon detecting that rendering of the content requires client watermarking, the client device 120 (e.g., the watermark engine 122 in FIG. 1A) records screen captures and further processes the screen captures as described above with reference to FIG. 1B in accordance with some embodiments. Also as described above with reference to FIG. 1B, in some embodiments, processing the screen captures includes compressing and/or splitting the images, extracting fingerprints, and/or deriving metadata from the images.

In step 9, when the current time is approaching the expiration time associated with the license and/or the token(s), the client device 120 sends the renewal request(s) to the control plane 101 and attaches at least a portion of the captured image and/or the metadata. In step 10, prior to processing the renewal request by the control plane 101, the validation engine 110 on the control plane 101 validates the client watermark based on the information in the renewal request(s) as well as the attached image and/or metadata in accordance with some embodiments.

Figure 3:
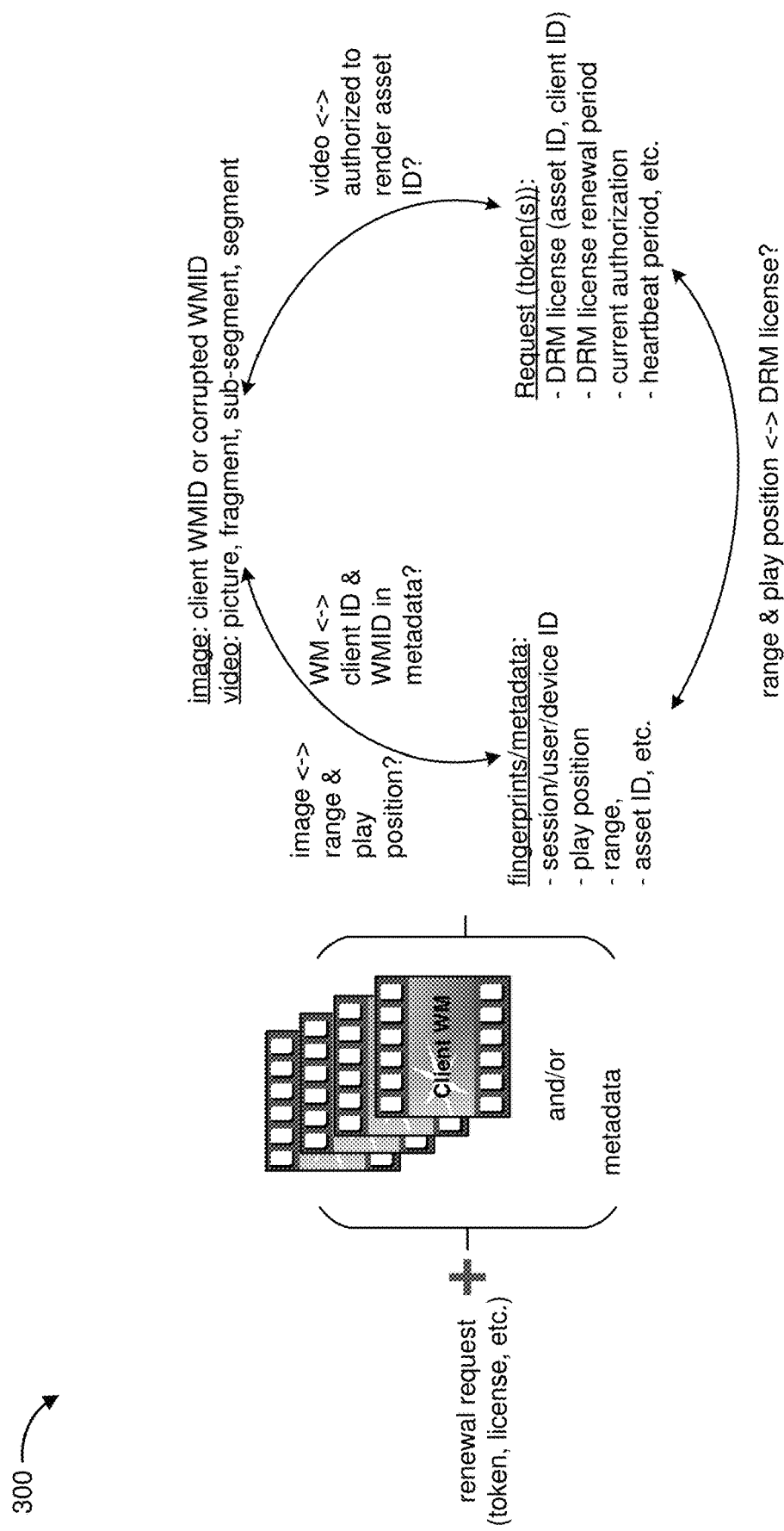
FIG. 3 is a diagram illustrating validating client watermarks by the validation engine, in accordance with some embodiments.

For example, FIG. 3 is a diagram 300 illustrating validating client watermarks by the validation engine 110 (FIGS. 1A and 2) in accordance with some embodiments. In some embodiments, when the client device sends a renewal request (e.g., for renewing token(s) and/or license(s)) to the control plane, the client device also attaches at least a portion of the screen capture and/or metadata to the control plane along with the renewal request as described above with reference to FIGS. 1A-1B and 2. In some embodiments, at least a portion of the screen capture includes the captured image as is, the compressed or partially compressed of images, the fingerprints of the images. In the case the captured image includes a video, at least a portion of the screen capture includes segments, partial segments, fragments, and/or frames, etc. from the captured video. Moreover, the captured image includes the client watermark, and from the captured image, the validation engine on the control plane determines the presence of the client watermark and whether the watermark in the image is corrupted.

In some embodiments, as described above with reference to FIGS. 1A and 1B, the metadata derived from the request, the token, and/or image include the played asset, the client identifier(s) (e.g., client ID, device ID, and/or session ID, etc.), and/or the playback position, etc. Further as described above with reference to FIGS. 1A and 1B, from the renewal request, the validation engine derives information related to the DRM license, the current authorization for resources, and/or the notion of time for heartbeat or concurrency requests, etc. In some embodiments, the validation engine compares the information from the image, the metadata, and/or the request to validate the client watermark.

For example, in the case of the image being a video capture of the rendering media content item, the validation compares the range (e.g., ranges associated with frames, segments, group of pictures, scene cuts, presentation timestamp, etc.) and play position derived from the image with the range and play position specified in the metadata. In another example, upon recognizing the watermark in the image, the validation engine compares the watermark with the watermark ID and the client ID specified in the metadata. In still another example, the validation engine uses fingerprint techniques to detect the played asset and the play position in the video capture and compares with the client ID, the asset ID, and the DRM license derives from the request to validate that the client plays the asset licensed to the client and the play position fits in the range where the DRM license renewal is requested. Alternatively, instead of applying the fingerprint techniques at the server, in some embodiments, the client device processes the screen capture such as deriving the fingerprints and send the fingerprints and/or the metadata to the control plane, as described above with reference to FIG. 2. In such embodiments, as shown in FIG. 3, the validation engine can compare the fingerprints and/or metadata with the request to validate that the client plays the asset licensed to the client and the play position fits in the range where the DRM license renewal is requested.

Referring back to FIG. 2, once the validation engine 110 determines that the client watermark is valid, as indicated by the box with dotted line borders, the control plane 101 requests a license renewal from the DRM server(s) 103 for the client device 120 in step 11, receives the renewed DRM license in step 12, and sends the renewed license and/or token(s) to the client device 120. The client device 120 can then use the renewed license and/or token(s) for continued content request and/or decryption in steps 14a and 14b, respectively. On the other hand, though not shown in FIG. 2, when the validation engine 110 cannot validate the client watermark (or cannot detect the presence of a valid client watermark), the control plane 101 can take actions to disrupt the content consumption by the client device 120. Such actions include, but are not limited to, forcing immediate or postponed deactivation of the user account and/or the client device 120, blocking or denying the DRM license renewal, accumulating analytics for the user and/or client device 120 and performing actions later, and/or limiting content resolution for the user and/or client device 120. As such, even though the solution described herein does not prevent the client watermark removal or tampering at the client device 120, the solution allows the control plane 101 to detect that a client watermark has been removed or tampered with.

Figure 4:
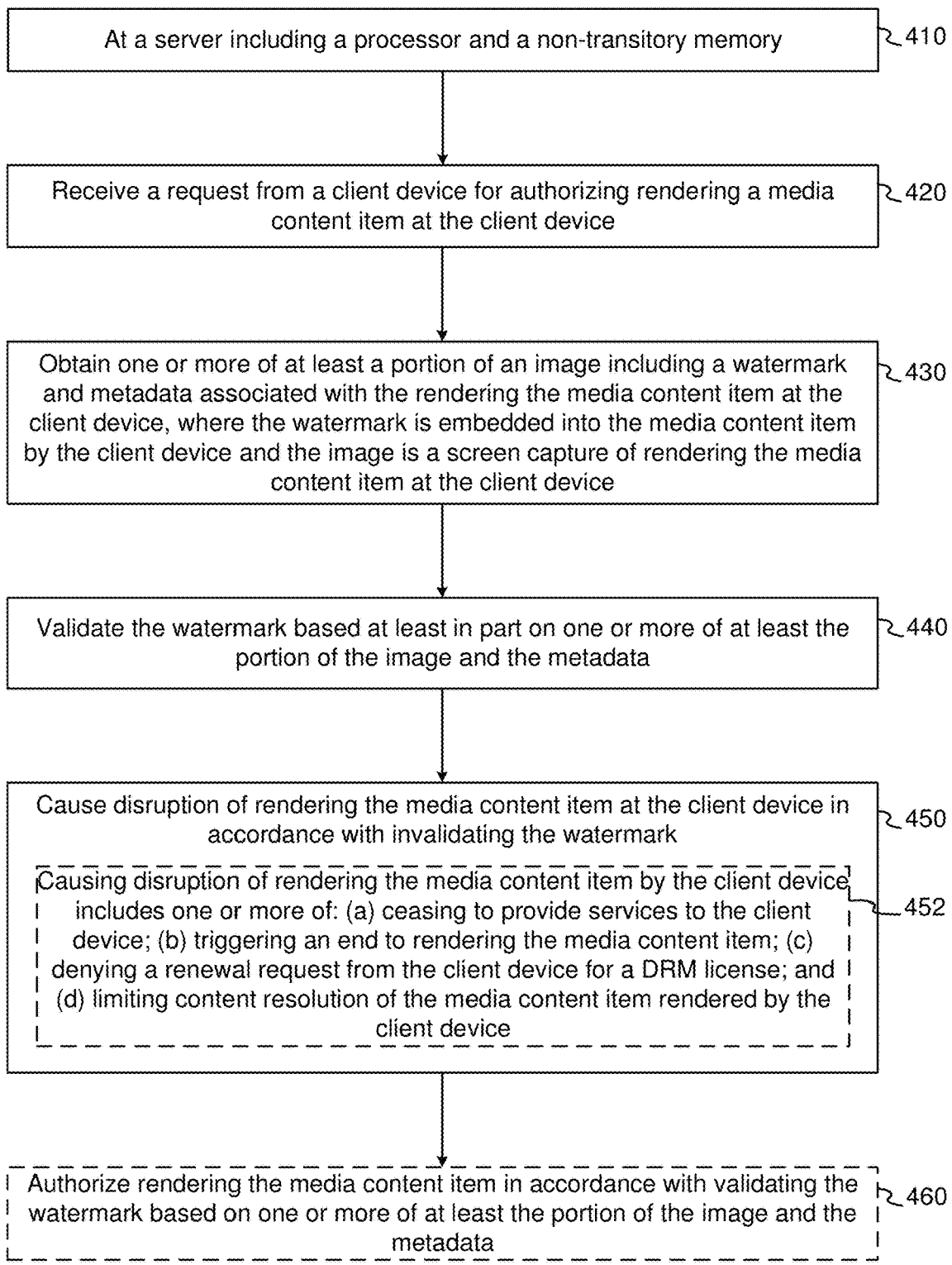
FIG. 4 is a flow diagram illustrating a method of validating a client watermark at a server, in accordance with some embodiments.

FIG. 4 is a flow diagram illustrating a method 400 of validating a client watermark at a server in accordance with some embodiments. As represented by block 410, in some embodiments, the method 400 is performed at a server that includes a processor and a non-transitory memory, e.g., a server hosting the control plane 101 and/or the validation engine 110 in FIGS. 1A-1B and 2. As represented by block 420, the method 400 begins with the server receiving a request from a client device for authorizing rendering a media content item at the client device. For example, in FIG. 1A and in step 9 of FIG. 2, the control plane 101 receives a request from the client device 120 for a license renewal, a control plane token renewal, and/or a CDN token renewal, etc.

The method 400 continues, as represented by block 430, with the server obtaining one or more of at least a portion of an image including a watermark and metadata associated with rendering the media content item at the client device, where the watermark is embedded into the media content item by the client device and the image is a screen capture of rendering the media content item at the client device. For example, as described above with reference to FIGS. 1A and 1B, the watermark engine 122 on the client device 120 embeds the watermark into the media content item and captures the screen rendering of the media content item where the image from the screen capture includes the client watermark. Further, as shown in FIG. 1B, the control plane 101 obtains at least a portion of the captured image with the client watermark and/or the metadata from the client device, e.g., obtaining from client device 1 120-1 the images embedded with client watermark 1, obtaining from client device 2 120-2 the fragments and/or compressed images embedded with client watermark 2, or obtaining from client device N 120-N the fingerprints and/or the metadata associated with client watermark N.

As represented by block 440, the method 400 also includes validating the watermark based at least in part on one or more of at least the portion of the image and the metadata. For example, FIG. 3 illustrates various embodiments of the control plane validating the client watermark based on the request, the received portion of the image, and/or the metadata. As shown in FIG. 3, in some embodiments, the validating includes determining whether or not the watermark exists in at least the portion of the image, e.g., the presence of a watermark ID or whether the watermark ID is corrupted, and determining whether or not the watermark is associated with the client device sending the request based on a client identifier specified in the request and a watermark identifier specified in the metadata. In other words, the control plane, prior to processing the client request, validates whether the watermark ID belongs to the same session, user, and/or client device that makes the request base on the information in the tokens attached to the request.

In another example, as described with reference to FIG. 3, in some embodiments, the image includes a video capture of rendering the media content item within a first range at the client device. In such embodiments, the validating includes: (a) determining whether or not the video belongs to the media content item; (b) determining the client device has been previously authorized to render the media content item based on a client identifier and a media content item identifier specified in the request; and (c) determining whether or not the first range matches a second range specified in the metadata. As such, in case a video was captured as the image, the control plane can validate that the video fragment belongs to the currently played asset and the played fragment belongs to a proper range, etc.

In yet another example, as described above with reference to FIG. 3, in some embodiments, the media content item is a video encrypted using a DRM license. In such embodiments, the request includes a license request to renew the DRM license, and one or more of at least the portion of the image and the metadata are attached to the request in accordance with some embodiments. In other words, for DRM protected content, the client device can send the watermark image as is or after some processing to the control plane separately or upon a DRM license renewal request, a heartbeat request, and/or a concurrency request as shown in FIG. 1A. In such embodiments, validating the watermark based at least in part on one or more of at least the portion of the image and the metadata includes: (a) determining, based on the video, the media content item is authorized to be rendered by the client device; (b) determining a range associated with the DRM license; and (c) validating a playback position in the video is within the range. As shown in FIG. 3, in case the video is presented in the captured image, the control plane can use fingerprint techniques to detect the played asset and the playback position to validate that the user plays a licensed asset and the play position fits within the range where the DRM license renewal is required in case the watermark validation is performed upon the DRM license renewal request.

Still referring to FIG. 4, as represented by block 450, the method 400 continues with the server causing disruption of rendering the media content item at the client device in accordance with invalidating the watermark. In such embodiments, causing disruption of rendering the media content item by the client device includes one or more of: (a) ceasing to provide services to the client device (e.g., blacklist the corresponding session, user, and/or client device); (b) triggering an end to rendering the media content item (e.g., enforcing playback stop); (c) denying a renewal request from the client device for a DRM license (e.g., not to renew license and/or tokens); and (d) limiting content resolution of the media content item rendered by the client device (e.g., downgrading the content quality). On the other hand, as represented by block 460, the method 400 further includes authorizing rendering the media content item in accordance with validating the watermark based on one or more of at least the portion of the image and the metadata. For example, in FIG. 2, having validated the client watermark, in steps 11-13 and 14a-14b, the control plane 101 obtains the renewed license for the client device 120 and sends the renewed license to the client device 120 so that the client device 120 can use the renewed license to decrypt the content for continued rendering.

Figure 5:
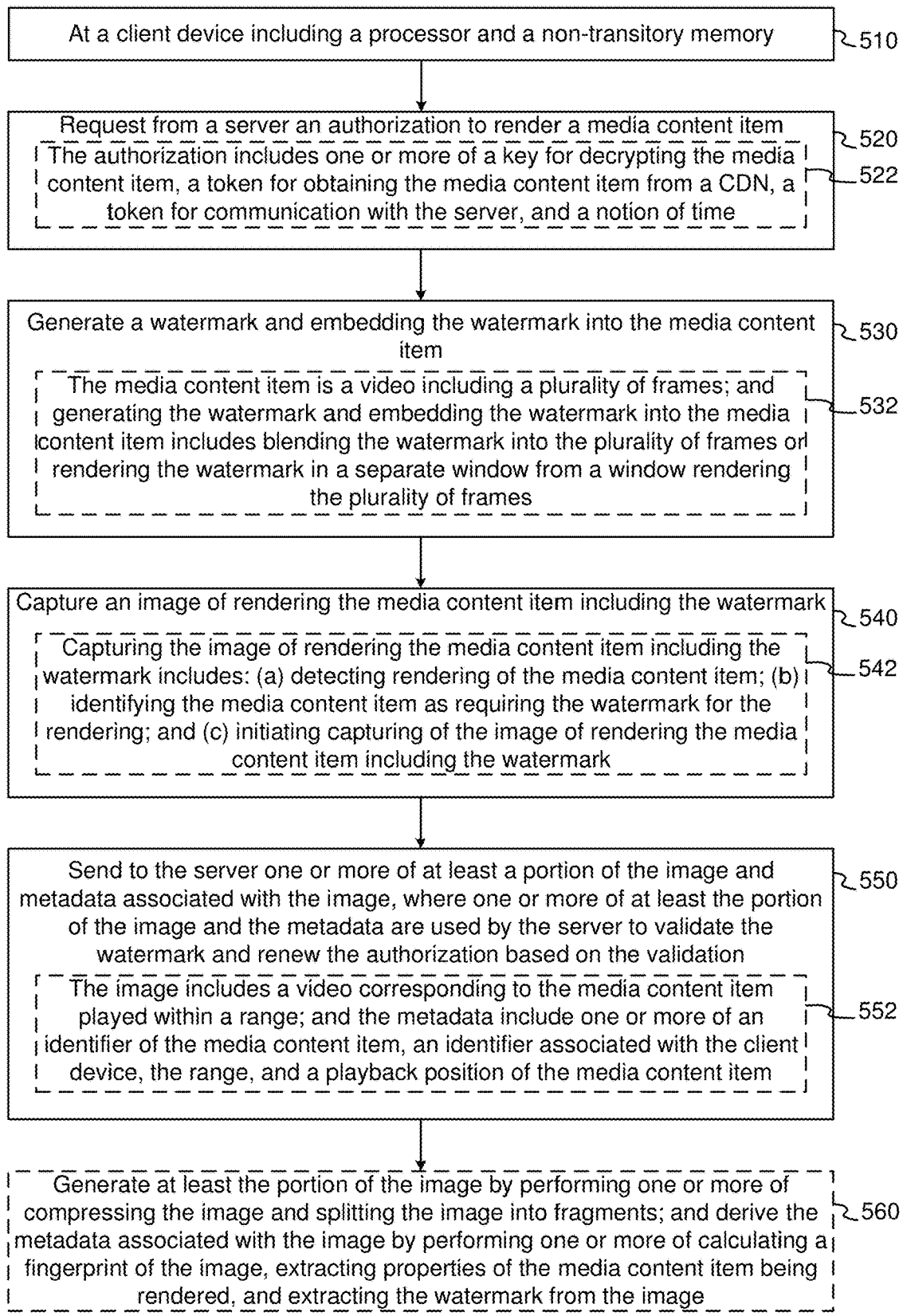
FIG. 5 is a flow diagram illustrating a method of sending a client watermark to a server for validation and continued services, in accordance with some embodiments.

FIG. 5 is a flow diagram illustrating a method 500 of sending a client watermark to a server for validation and continued services in accordance with some embodiments. As represented by block 510, in some embodiments, the method 500 is performed at a client device that includes a processor and a non-transitory memory, e.g., the client device 120 in FIGS. 1A-1B and 2 including the watermark engine 122, the application 124, and the player 126. As represented by block 520, the method 500 begins with the client device requesting from a server (e.g., the control plane 101 in FIGS. 1A-1B and 2) an authorization to render a media content item. As represented by block 522, in some embodiments, The authorization includes one or more of a key for decrypting the media content item, a token for obtaining the media content item from a CDN, a token for communication with the server, and a notion of time. For example, in FIG. 1A and in step 9 of FIG. 2, a respective client device 120 sends to the control plane 101 for a license renewal, a control plane token renewal, a CDN token renewal, a heartbeat request, and/or a concurrency request, etc.

The method 500 continues, as represented by block 530, with the client device (e.g., the watermark engine 122 in FIG. 1A) generating a watermark and embedding the watermark into the media content item. In some embodiments, as represented by block 532, when the media content item is a video including a plurality of frames, generating the watermark and embedding the watermark into the media content item includes blending the watermark into the plurality of frames or rendering the watermark in a separate window from a window rendering the plurality of frames. For example, in FIG. 1B, client device 1 120-1 renders client watermark 1 on top of the window rendering the video frames, while client device 2 120-2 blends client watermark 2 into the video frames.

The method 500 continues, as represented by block 540, with the client device (e.g., the watermark engine 122 in FIG. 1A) capturing an image of rendering the media content item including the watermark. In some embodiments, as represented by block 542, capturing the image of rendering the media content item including the watermark includes: (a) detecting rendering of the media content item; (b) identifying the media content item as requiring the watermark for the rendering; and (c) initiating capturing of the image of rendering the media content item including the watermark. For example, as shown in step 9 of FIG. 2, the client device 120 (e.g., the watermark engine 122 in FIG. 1A) enables the capturing of the video playback window when the client device 120 (e.g., the player 126-1 in FIG. 1A) plays the assets that require watermarking. Whether the watermarking blended with the video frames or rendered in a separate window on top of the playback windows, the captured image includes the watermarking.

The method 500 continues, as represented by block 550, with the client device (e.g., the application 124 in FIG. 1A) sending to the server one or more of at least a portion of the image and metadata associated with the image, where one or more of at least the portion of the image and the metadata are used by the server to validate the watermark and renew the authorization based on the validation. For example, in FIG. 1B, client device 1 120-1 sends to the control plane 101 the images embedded with client watermark 1; client device 2 120-2 sends to the control plane 101 the fragments and/or compressed images embedded with client watermark 2; and client device N 120-N sends to the control plane 101 the fingerprints and/or the metadata associated with client watermark N.

In some embodiments, as represented by block 552, the image includes a video corresponding to the media content item played within a range, and the metadata include one or more of an identifier of the media content item, an identifier associated with the client device, the range, and a playback position of the media content item. As such, as shown in FIG. 3, in case the video is presented in the captured image, the control plane can use fingerprint techniques to detect the played asset and the playback position to validate that the user plays a licensed asset and the play position fits within the range where the DRM license renewal is required in case the watermark validation is performed upon the DRM license renewal request.

In some embodiments, as represented by block 560, the method 500 further includes generating at least the portion of the image by performing one or more of compressing the image and splitting the image into fragments, and deriving the metadata associated with the image by performing one or more of calculating a fingerprint of the image, extracting properties of the media content item being rendered, and extracting the watermark from the image. As such, the client device can send the captured image as is or can process images, including compressed images, fragments, fingerprint values, full or partial metadata can be extracted, etc.

Figure 6:
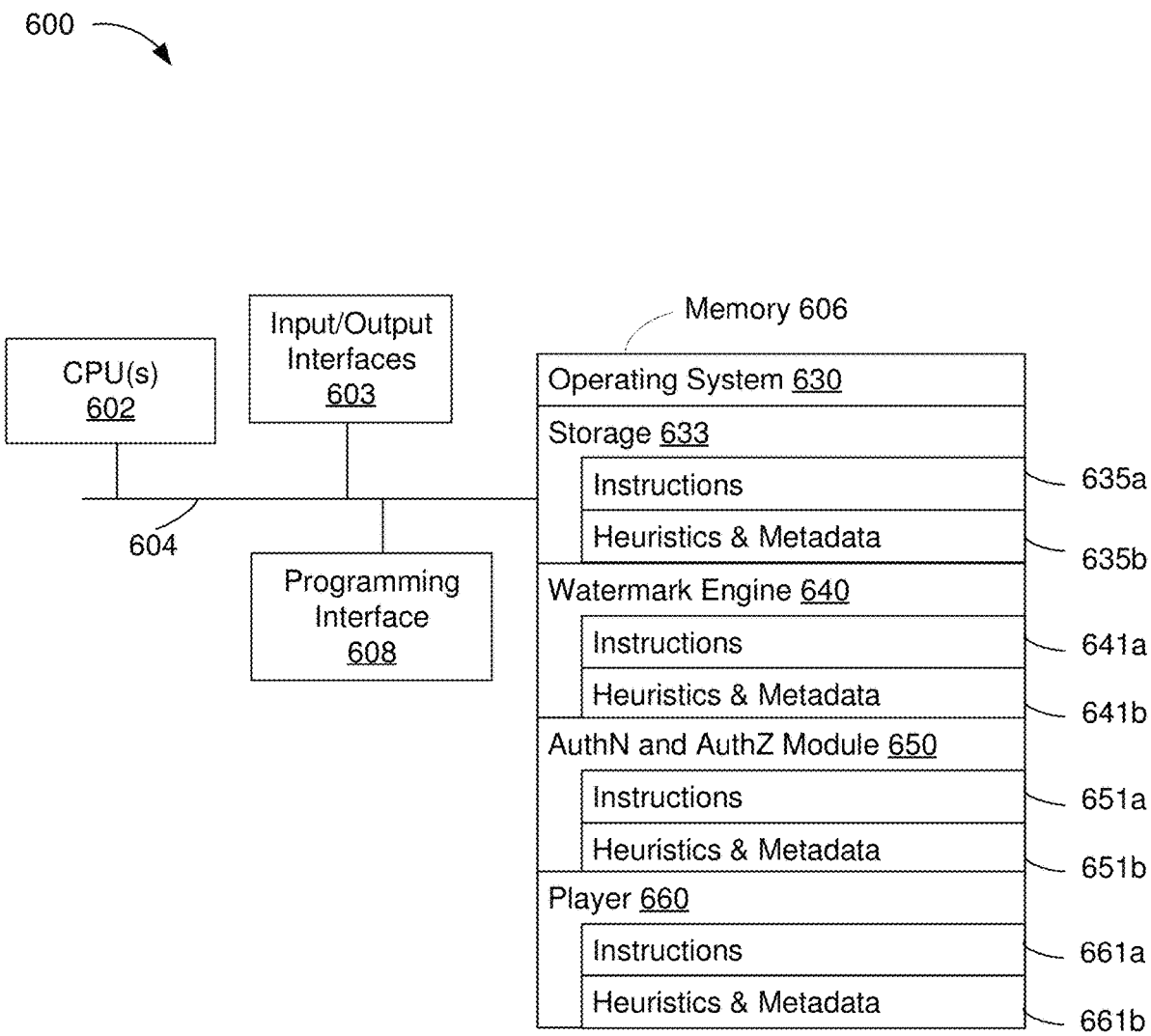
FIG. 6 is a block diagram of a computing device for secure client watermark validation, in accordance with some embodiments.

FIG. 6 is a block diagram of a computing device 600 for secure client watermark validation in accordance with some embodiments. In some embodiments, the computing device 600 performs one or more functions of the client device 120 (FIGS. 1A-1B and 2) and performs one or more of the functionalities described above with respect to the client device 120. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 600 includes one or more processing units (CPUs) 602 (e.g., processors), one or more input/output interfaces 603 (e.g., input devices, sensors, a network interface, a display, etc.), a memory 606, a programming interface 608, and one or more communication buses 604 for interconnecting these and various other components.

In some embodiments, the communication buses 604 include circuitry that interconnects and controls communications between system components. The memory 606 includes high-speed random access memory, such as DRAM, SRAM, DDR RAM or other random access solid state memory devices; and, in some embodiments, include non-volatile memory, such as one or more magnetic disk storage devices, optical disk storage devices, flash memory devices, or other non-volatile solid state storage devices. The memory 606 optionally includes one or more storage devices remotely located from the CPU(s) 602. The memory 606 comprises a non-transitory computer readable storage medium. Moreover, in some embodiments, the memory 606 or the non-transitory computer readable storage medium of the memory 606 stores the following programs, modules and data structures, or a subset thereof including an optional operating system 630, a storage module 633, a watermark engine 640, an authentication and/or authorization module 650, and a player 660. In some embodiments, one or more instructions are included in a combination of logic and non-transitory memory. The operating system 630 includes procedures for handling various basic system services and for performing hardware dependent tasks.

In some embodiments, the storage module 633 stores multimedia content and/or client watermark images for rendering and/or client watermark embedding. To that end, the storage module 633 includes a set of instructions 635a and heuristics and metadata 635b.

In some embodiments, the watermark engine 640 (e.g., the watermark engine 122 in FIG. 1A) is configured to generate, embed client watermarks in media content, perform screen captures of rendering media content with the embedded client watermarks, and/or process the screen captures. To that end, the watermark engine 640 includes a set of instructions 641a and heuristics and metadata 641b.

In some embodiments, the authentication and/or authorization module 650 (e.g., the application 124 in FIG. 1A) is configured to request and/or obtain authentication and/or authorization from the control plane, e.g., requesting and/or obtaining tokens and/or licenses renewals and/or validation of the client watermarks, etc. To that end, the authentication and/or authorization module 650 includes a set of instructions 651*a* and heuristics and metadata 651*b*.

In some embodiments, the player 660 (e.g., the player 126 in FIG. 1A) is configured to use the authorizations and/or licenses from the authentication and/or authorization module 650 for decoding and/or decrypting the media content and render the media content with the client watermarks provided by the watermark engine 640. To that end, the player 660 includes a set of instructions 661*a* and heuristics and metadata 661*b*.

Although the storage module 633, the watermark engine 640, the authentication and/or authorization module 650, and the player 660 are illustrated as residing on a single computing device 600, it should be understood that in other embodiments, any combination of the storage module 633, the watermark engine 640, the authentication and/or authorization module 650, and the player 660 can reside in separate computing devices in various embodiments. For example, in some embodiments, each of the storage module 633, the watermark engine 640, the authentication and/or authorization module 650, and the player 660 resides on a separate computing device.

Moreover, FIG. 6 is intended more as functional description of the various features which are present in a particular implementation as opposed to a structural schematic of the embodiments described herein. As recognized by those of ordinary skill in the art, items shown separately could be combined and some items could be separated. For example, some functional modules shown separately in FIG. 6 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

Figure 7:
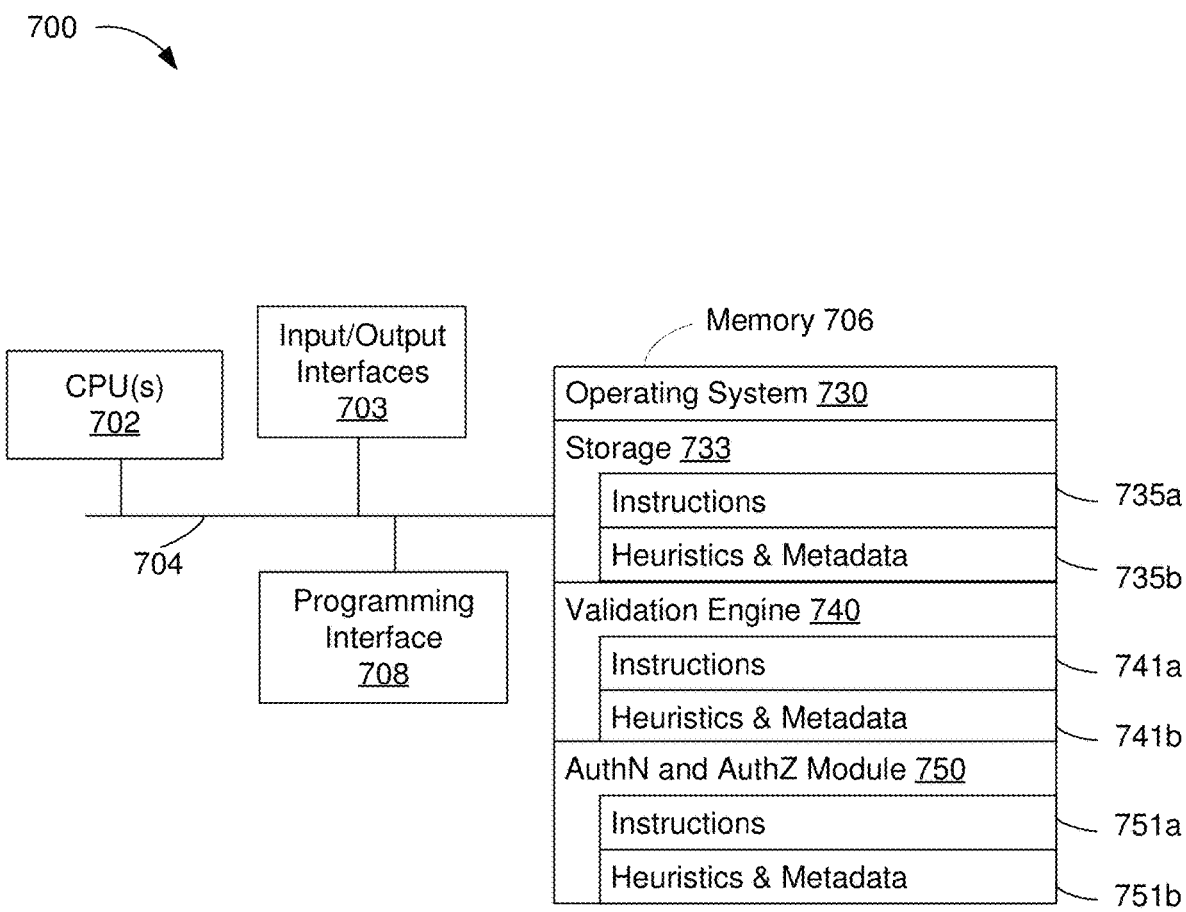
FIG. 7 is a block diagram of another computing device for secure client watermark validation, in accordance with some embodiments.

FIG. 7 is a block diagram of another computing device 700 for secure client watermark validation in accordance with some embodiments. In some embodiments, the computing device 700 performs one or more functions of one or more servers hosting the control plane 101 (FIGS. 1A-1B and 2) and performs one or more of the functionalities described above with respect to the control plane 101. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 700 includes one or more processing units (CPUs) 702 (e.g., processors), one or more input/output interfaces 703 (e.g., input devices, sensors, a network interface, a display, etc.), a memory 706, a programming interface 708, and one or more communication buses 704 for interconnecting these and various other components.

In some embodiments, the communication buses 704 include circuitry that interconnects and controls communications between system components. The memory 706 includes high-speed random access memory, such as DRAM, SRAM, DDR RAM or other random access solid state memory devices; and, in some embodiments, include non-volatile memory, such as one or more magnetic disk storage devices, optical disk storage devices, flash memory devices, or other non-volatile solid state storage devices. The memory 706 optionally includes one or more storage devices remotely located from the CPU(s) 702. The memory 706 comprises a non-transitory computer readable storage medium. Moreover, in some embodiments, the memory 706 or the non-transitory computer readable storage medium of the memory 706 stores the following programs, modules and data structures, or a subset thereof including an optional operating system 730, a storage module 733, a validation engine 740, and an authentication and/or authorization module 750. In some embodiments, one or more instructions are included in a combination of logic and non-transitory memory. The operating system 730 includes procedures for handling various basic system services and for performing hardware dependent tasks.

In some embodiments, the storage module 733 stores authentication and/or authorization information for validating clients. To that end, the storage module 733 includes a set of instructions 735*a* and heuristics and metadata 735*b*.

In some embodiments, the validation engine 740 (e.g., the validation engine 110 in FIGS. 1A-1B and 2) is configured to validate client watermarks based on the requests, tokens, and/or the screen captures from the clients and/or cause disruption of services to the clients in case of detecting potential client watermark tampering. To that end, the validation engine 740 includes a set of instructions 741*a* and heuristics and metadata 741*b*.

In some embodiments, the authentication and/or authorization module 750 (e.g., a module in the control plane 101 in FIGS. 1A-1B and 2) is configured to receive requests from clients and provide authentication and/or authorization to the clients, e.g., providing tokens, licenses, renewed tokens, renewed licenses, refreshed heatbeat and/or concurrency information, etc. To that end, the authentication and/or authorization module 750 includes a set of instructions 751*a* and heuristics and metadata 751*b*.

Although the storage module 733, the validation engine 740, and the authentication and/or authorization module 750 are illustrated as residing on a single computing device 700, it should be understood that in other embodiments, any combination of the storage module 733, the validation engine 740, and the authentication and/or authorization module 750 can reside in separate computing devices in various embodiments. For example, in some embodiments, each of the storage module 733, the validation engine 740, and the authentication and/or authorization module 750 resides on a separate computing device.

Moreover, FIG. 7 is intended more as functional description of the various features which are present in a particular implementation as opposed to a structural schematic of the embodiments described herein. As recognized by those of ordinary skill in the art, items shown separately could be combined and some items could be separated. For example, some functional modules shown separately in FIG. 7 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first device could be termed a second device, and, similarly, a second device could be termed a first device, which changing the meaning of the description, so long as all occurrences of the "first device" are renamed consistently and all occurrences of the "second device" are renamed consistently. The first device and the second device are both devices, but they are not the same device.

The terminology used herein is for the purpose of describing particular embodiments only and is not intended to be limiting of the claims. As used in the description of the embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting", that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The invention claimed is:

1. A method comprising:
    at a server including a processor and a non-transitory memory:
    receiving a request from a client device for authorizing rendering a media content item at the client device, wherein the request includes a request for a renewal of the authorization to render the media content upon the client device determining current time is within a threshold from an expiration time associated with the authorization;
    obtaining one or more of at least a portion of an image including a watermark and metadata associated with rendering the media content item at the client device, wherein the watermark is embedded into the media content item by the client device and the image is a screen capture of rendering the media content item at the client device, and one or more of at least the portion of the image and the metadata are received from the client device along with the request for the renewal of the authorization;
    validating the watermark based at least in part on one or more of at least the portion of the image and the metadata; and
    causing disruption of rendering the media content item at the client device in accordance with invalidating the watermark.

2. The method of claim 1, wherein causing disruption of rendering the media content item by the client device includes one or more of:
    ceasing to provide services to the client device;
    triggering an end to rendering the media content item;
    denying a renewal request from the client device for a digital rights management (DRM) license; and
    limiting content resolution of the media content item rendered by the client device.

3. The method of claim 1, further comprising:
    authorizing rendering the media content item in accordance with validating the watermark based on one or more of at least the portion of the image and the metadata.

4. The method of claim 1, wherein validating the watermark based at least in part on one or more of at least the portion of the image and the metadata includes:
    determining whether or not the watermark exists in at least the portion of the image; and
    determining whether or not the watermark is associated with the client device sending the request based on a client identifier specified in the request and a watermark identifier specified in the metadata.

5. The method of claim 1, wherein the image includes a video capture of rendering the media content item within a first range at the client device, and the validating includes:
    determining whether or not the video belongs to the media content item;
    determining the client device has been previously authorized to render the media content item based on a client identifier and a media content item identifier specified in the request; and
    determining whether or not the first range matches a second range specified in the metadata.

6. The method of claim 1, wherein:
    the media content item is a video encrypted using a DRM license;
    the request includes a license request to renew the DRM license; and
    one or more of at least the portion of the image and the metadata are attached to the request.

7. The method of claim 6, wherein validating the watermark based at least in part on one or more of at least the portion of the image and the metadata includes:
    determining, based on the video, the media content item is authorized to be rendered by the client device;
    determining a range associated with the DRM license; and
    validating a play position in the video is within the range.

8. A method comprising:
    at a client device including a processor and a non-transitory memory:
    requesting from a server an authorization to render a media content item, including requesting from the server a renewal of the authorization to render the media content upon determining current time is within a threshold from an expiration time associated with the authorization;

generating a watermark and embedding the watermark into the media content item;

capturing an image of rendering the media content item including the watermark; and sending to the server one or more of at least a portion of the image and metadata associated with the image, including sending one or more of at least the portion of the image and the metadata along with the request for the renewal of the authorization, wherein one or more of at least the portion of the image and the metadata are used by the server to validate the watermark and renew the authorization based on the validation.

9. The method of claim 8, wherein the authorization includes one or more of a key for decrypting the media content item, a token for obtaining the media content item from a content delivery network (CDN), a token for communication with the server, and a notion of time.

10. The method of claim 8, wherein:
the media content item is a video including a plurality of frames; and
generating the watermark and embedding the watermark into the media content item includes blending the watermark into the plurality of frames or rendering the watermark in a separate window from a window rendering the plurality of frames.

11. The method of claim 8, wherein capturing the image of rendering the media content item including the watermark includes:
detecting rendering of the media content item;
identifying the media content item as requiring the watermark for the rendering; and
initiating capturing of the image of rendering the media content item including the watermark.

12. The method of claim 8, wherein:
the image includes a video corresponding to the media content item played within a range; and
the metadata include one or more of an identifier of the media content item, an identifier associated with the client device, the range, and a playback position of the media content item.

13. The method of claim 8, further comprising:
generating at least the portion of the image by performing one or more of compressing the image and splitting the image into fragments; and
deriving the metadata associated with the image by performing one or more of calculating a fingerprint of the image, extracting properties of the media content item being rendered, and extracting the watermark from the image.

14. A system comprising:
a client device including a first processor, a first non-transitory memory, and one or more first programs stored in the first non-transitory memory, which, when executed by the first processor, cause the client device to:
request from a server an authorization to render a media content item, including requesting from the server a renewal of the authorization to render the media content upon determining current time is within a threshold from an expiration time associated with the authorization;
generate a watermark and embedding the watermark into the media content item;
capture an image of rendering the media content item including the watermark; and
send to the server one or more of at least a portion of the image and metadata associated with the image, including sending one or more of at least the portion of the image and the metadata along with the request for the renewal of the authorization, wherein one or more of at least the portion of the image and the metadata are used by the server to validate the watermark and renew the authorization based on the validation; and the server, communicatively coupled to the client device, including a second processor, a second non-transitory memory, and one or more second programs stored in the second non-transitory memory, which, when executed by the second processor, cause the server to:
receive the request for the authorization to render the media content item at the client device, wherein the request includes the renewal of the authorization to render the media content;
obtain one or more of at least the portion of the image including the watermark and the metadata associated with rendering the media content item at the client device, wherein the watermark is embedded into the media content item by the client device and the image is a screen capture of rendering the media content item at the client device, and one or more of at least the portion of the image and the metadata are received from the client device along with the request for the renewal of the authorization;
validate the watermark based at least in part on one or more of at least the portion of the image and the metadata; and
cause disruption of rendering the media content item at the client device in accordance with invalidating the watermark.

15. The system of claim 14, wherein causing disruption of rendering the media content item by the client device includes one or more of:
ceasing to provide services to the client device;
triggering an end to rendering the media content item;
denying a renewal request from the client device for a DRM license; and
limiting content resolution of the media content item rendered by the client device.

16. The system of claim 14, wherein the one or more second programs, which, when executed by the second processor, cause the server to authorize rendering the media content item in accordance with validating the watermark based on one or more of at least the portion of the image and the metadata.

17. The system of claim 14, wherein the authorization includes one or more of a key for decrypting the media content item, a token for obtaining the media content item from a content delivery network (CDN), a token for communication with the server, and a notion of time.

18. The system of claim 14, wherein:
the media content item is a video including a plurality of frames; and
generating the watermark and embedding the watermark into the media content item includes blending the watermark into the plurality of frames or rendering the watermark in a separate window from a window rendering the plurality of frames.

19. The system of claim 14, wherein capturing the image of rendering the media content item including the watermark includes:

detecting rendering of the media content item;
identifying the media content item as requiring the watermark for the rendering;
initiating capturing of the image of rendering the media content item including the watermark.

* * * * *